(12) United States Patent
Liao et al.

(10) Patent No.: US 8,446,711 B2
(45) Date of Patent: May 21, 2013

(54) HOUSING AND ELECTRONIC DEVICE USING THE SAME

(75) Inventors: Kai-Rong Liao, Shenzhen (CN);
Peng-Cheng Tong, Shenzhen (CN);
Po-Feng Ho, Shindian (TW); Shih-Wei Yang, Shindian (TW)

(73) Assignees: Shenzhen Futaihong Precision Industry Co., Ltd., Shenzhen (CN);
FIH (Hong Kong) Limited, Kowloon (HK)

( * ) Notice: Subject to any disclaimer, the term of this patent is extended or adjusted under 35 U.S.C. 154(b) by 333 days.

(21) Appl. No.: 12/911,843

(22) Filed: Oct. 26, 2010

(65) Prior Publication Data

US 2011/0235247 A1    Sep. 29, 2011

(30) Foreign Application Priority Data

Mar. 26, 2010    (CN) .......................... 2010 1 0133454

(51) Int. Cl.
*G06F 1/16*    (2006.01)

(52) U.S. Cl.
USPC .................................................. 361/679.01

(58) Field of Classification Search
USPC ....................................................... 361/679.01
See application file for complete search history.

(56) References Cited

U.S. PATENT DOCUMENTS

| | | | |
|---|---|---|---|
| 4,047,633 A * | 9/1977 | Trombly | 220/592.2 |
| 6,068,119 A * | 5/2000 | Derr et al. | 206/305 |
| 6,995,976 B2 * | 2/2006 | Richardson | 345/173 |
| 7,612,997 B1 * | 11/2009 | Diebel et al. | 361/679.56 |
| 7,894,185 B2 * | 2/2011 | Weber et al. | 361/679.56 |
| 2006/0104021 A1 * | 5/2006 | Chen et al. | 361/683 |
| 2008/0112122 A1 * | 5/2008 | Chang | 361/683 |
| 2010/0053859 A1 * | 3/2010 | Chang | 361/679.01 |
| 2010/0124040 A1 * | 5/2010 | Diebel et al. | 361/816 |
| 2012/0039023 A1 * | 2/2012 | Renwick | 361/679.01 |

* cited by examiner

*Primary Examiner* — Lisa Lea Edmonds
(74) *Attorney, Agent, or Firm* — Altis Law Group, Inc.

(57) ABSTRACT

A housing includes housing and a cover. The housing defines a receiving chamber and an open end communicating with the receiving chamber. The housing includes an opaque plastic member and a transparent glass member adhered to the plastic member. The opaque plastic member defines a display window hole. The cover seals the open end. The present disclosure further discloses an electronic device using the housing.

18 Claims, 6 Drawing Sheets

HOUSING AND ELECTRONIC DEVICE USING THE SAME

CROSS-REFERENCE TO RELATED APPLICATIONS

This application is one of the four related co-pending U.S. patent applications listed below. All listed applications have the same assignee and were concurrently filed herewith. The disclosure of each of the listed applications is incorporated by reference into all the other listed applications.

| Title | Inventors |
| --- | --- |
| HOUSING FOR ELECTRONIC DEVICES AND METHOD FOR MAKING THE SAME | Liao et al. |
| HOUSING FOR ELECTRONIC DEVICES AND METHOD FOR MAKING THE SAME | Liao et al. |
| HOUSING FOR ELECTRONIC DEVICES AND METHOD FOR MAKING THE SAME | Liao et al. |
| HOUSING AND ELECTRONIC DEVICE USING THE SAME | Liao et al. |

BACKGROUND

1. Technical Field

The present disclosure relates to housings and electronic devices using the housings.

2. Description of Related Art

Housings are one of the most important components of electronic devices, and are widely used in mobile phones, and personal digital assistants (PDAs). Typically, an electronic device housing includes a number of portions. The portions can be assembled together with the latching members. However, structures of these housings are complicated due to the latching members, and gaps usually exist at the junctions of the portions. Therefore, dust or other contaminants may easily enter into the housing through these gaps.

Therefore, there is room for improvement within the art.

BRIEF DESCRIPTION OF THE FIGURES

Many aspects of the housing and electronic device using the housing can be better understood with reference to the following figures. The components in the figures are not necessarily drawn to scale, the emphasis instead being placed upon clearly illustrating the principles of the housing and electronic device using the housing. Moreover, in the drawings like reference numerals designate corresponding parts throughout the several views.

DETAILED DESCRIPTION

Figure 1:
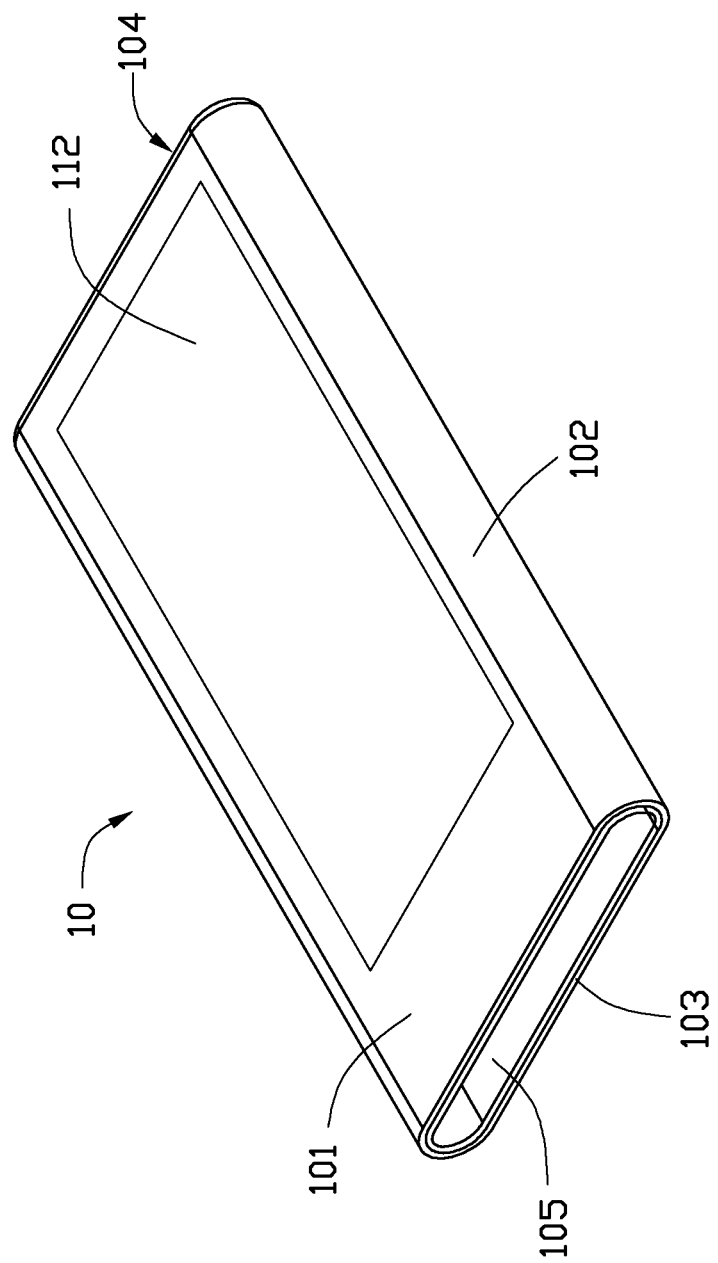
FIG. 1 is an exploded view of an exemplary embodiment of a housing used for an electronic device.
Figure 2:
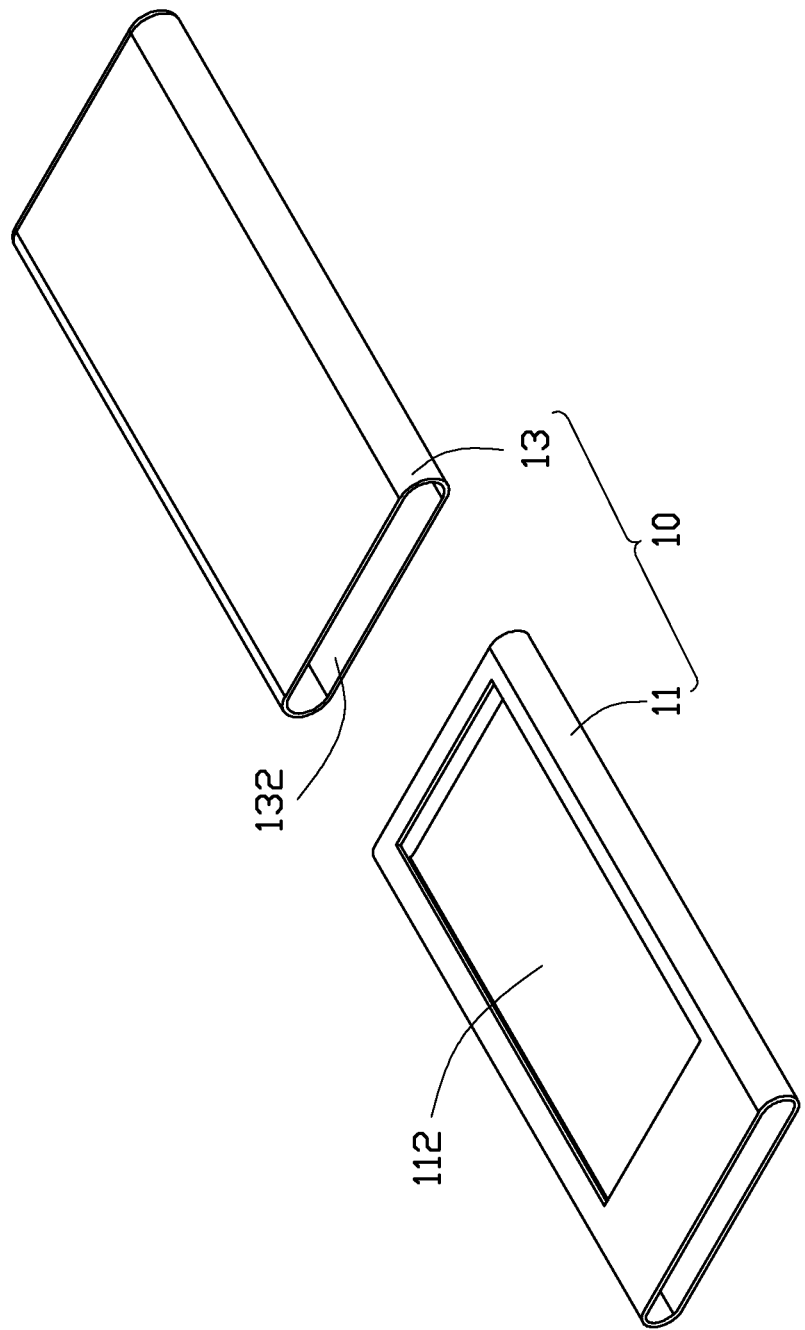
FIG. 2 is an assembled view of the housing in FIG. 1.

FIG. 1 and FIG. 2 show an exemplary housing 10 used in an electronic device, such as a mobile phone, or a personal digital assistant.

Referring to FIG. 1, the housing 10 may be a hollow sleeve, and includes a first sidewall 101, a second sidewall 103 opposite to the first sidewall 101, two connecting walls 102 connecting the first sidewall 101 to the second sidewall 103, and a top wall 104. The first sidewall 101, the connecting walls 102, the second sidewall 103, and the top wall 104 are integrally formed with each other and cooperatively define a first receiving chamber 105. The housing 10 includes an open end 106 opening the first receiving chamber 105. The first receiving chamber 105 receives an electronic module 40.

Referring to FIG. 2, the housing 10 includes an opaque plastic member 11 and a transparent glass member 13. The plastic member 11 may be a hollow sleeve made of an opaque moldable plastic. The opaque moldable plastic may be one or more thermoplastic materials selected from a group consisting of polycarbonate (PC), acrylonitrile-butadiene-styrene (ABS), polymethyl methacrylate (PMMA), butylene terephthalate (PBT), and phenylene sulfide (PPS). A display window hole 112 is defined in the first sidewall 101.

The glass member 13 may be a hollow sleeve made of toughened glass. The glass member 13 defines a second receiving chamber 132 for receiving the plastic member 11 in order to firmly connect the plastic member 11 to the glass member 13, an adhesive layer 30 is sandwiched between the plastic member 11 and the glass member 13 (see FIG. 5).

Figure 3:
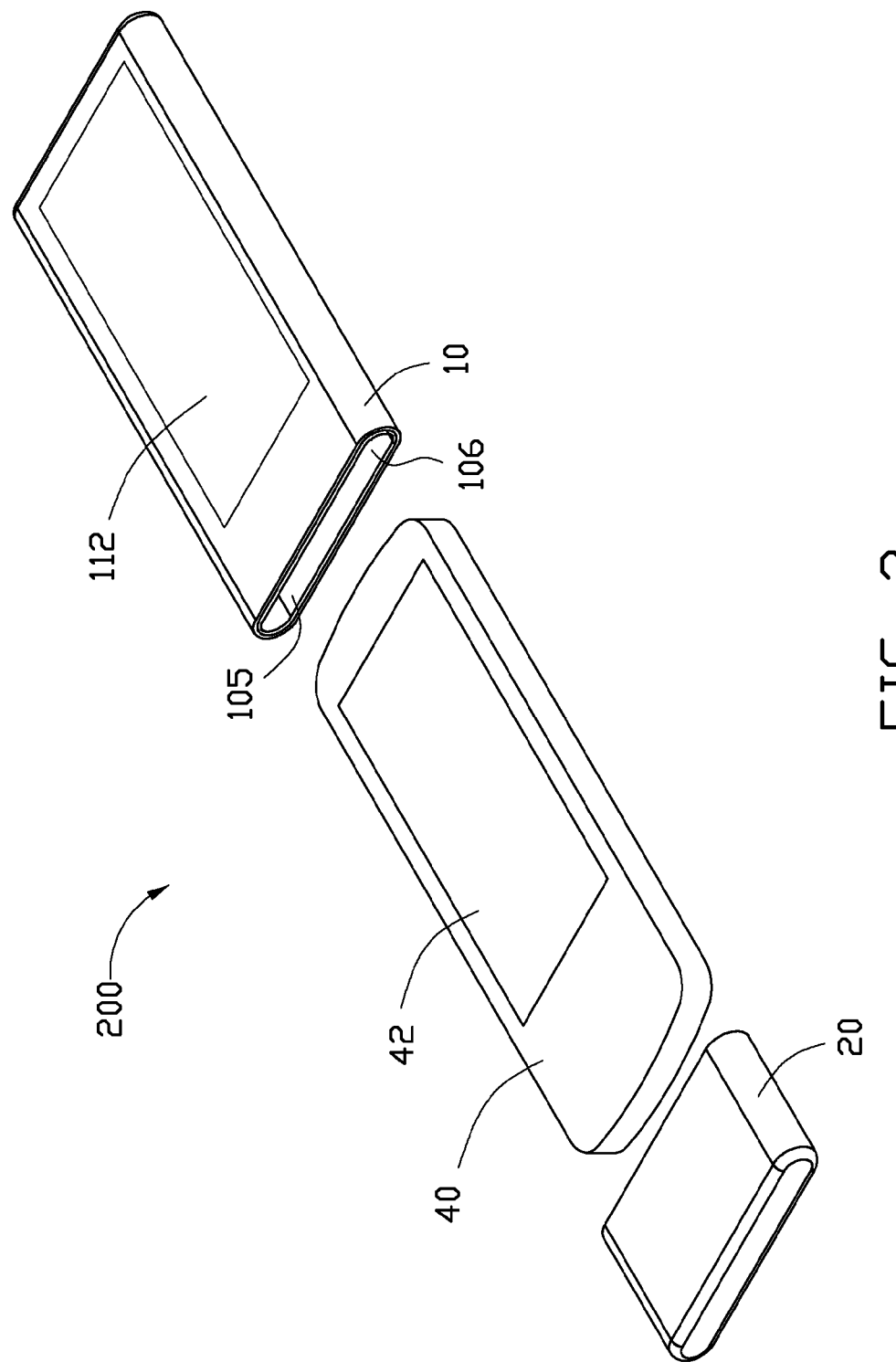
FIG. 3 is an exploded view of an exemplary embodiment of the electronic device shown in FIG. 1.

Referring to FIG. 3, the electronic device 200 includes the housing 10, a cover 20 and an electronic module 40. The cover 20 may be made of plastic or metal, and seals the open end 106 by adhesive.

Figure 4:
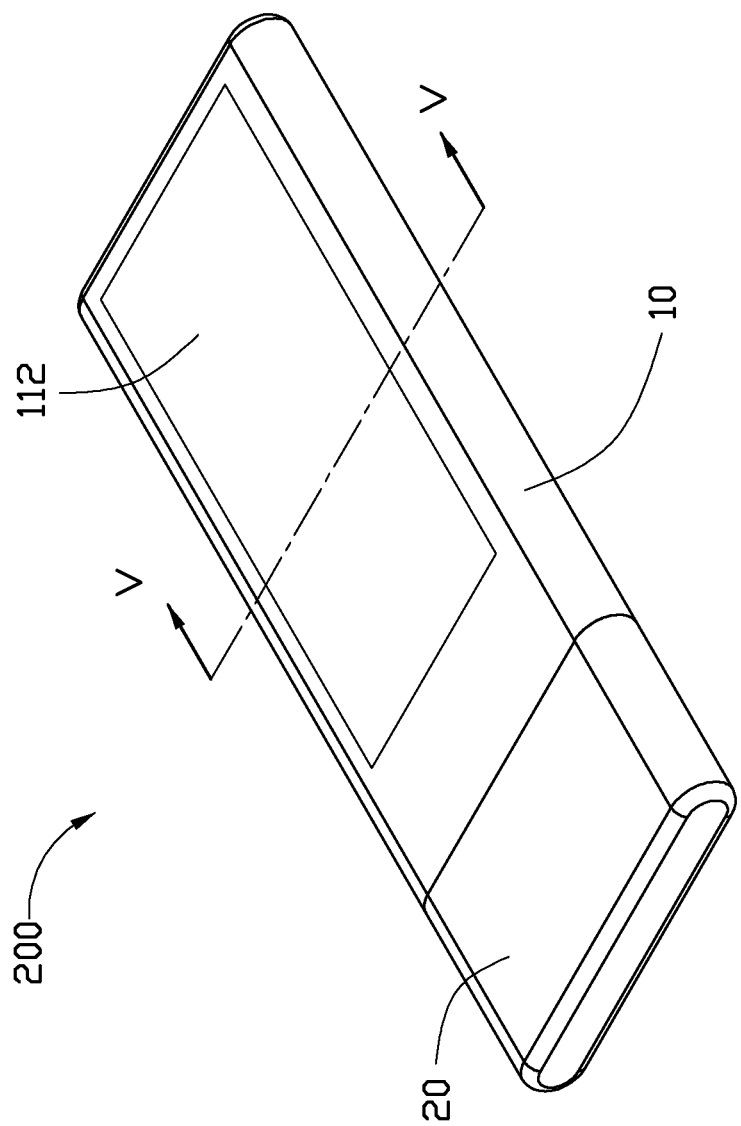
FIG. 4 is an assembled view of the exemplary embodiment of the electronic device shown in FIG. 3.
Figure 5:
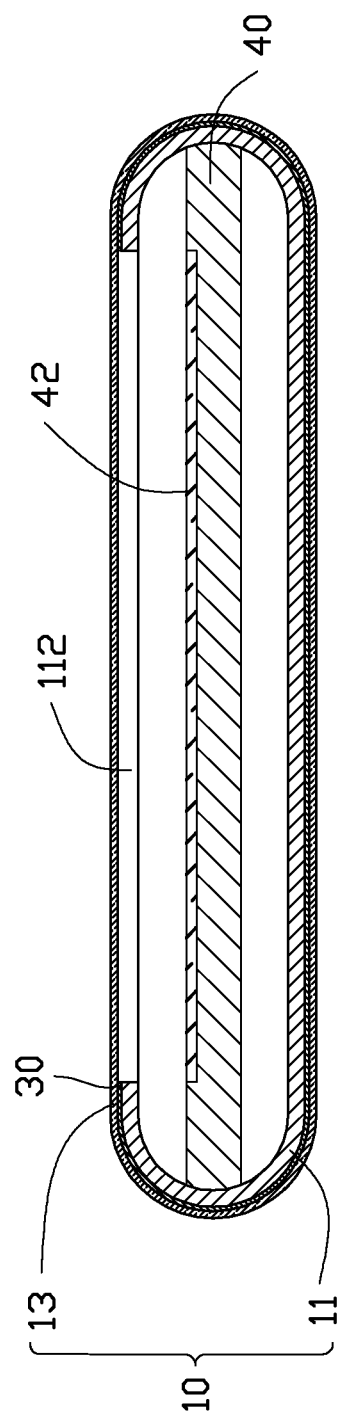
FIG. 5 is a cross-sectional view of the housing in FIG. 4 having an adhesive layer taken along line V-V.

Referring to FIG. 4 and FIG. 5, the electronic module 40 includes a touch display screen 42 for displaying information and operating. The electronic module 40 is inserted into the first receiving chamber 105 from the open end 106. The display screen 42 is exposed from the display window hole 112. The cover 20 seals the open end 106 by the adhesive.

The housing 10 is a hollow sleeve only including one open end 106. When the cover 20 seals the open end 106, only one bonding line is defined between the cover 20 and the housing 10. Thus, this kind of the housing 10 can reduce the rate of the contamination entering into the electronic device from the gap, and the appearance of the housing is more smooth and attractive.

Figure 6:
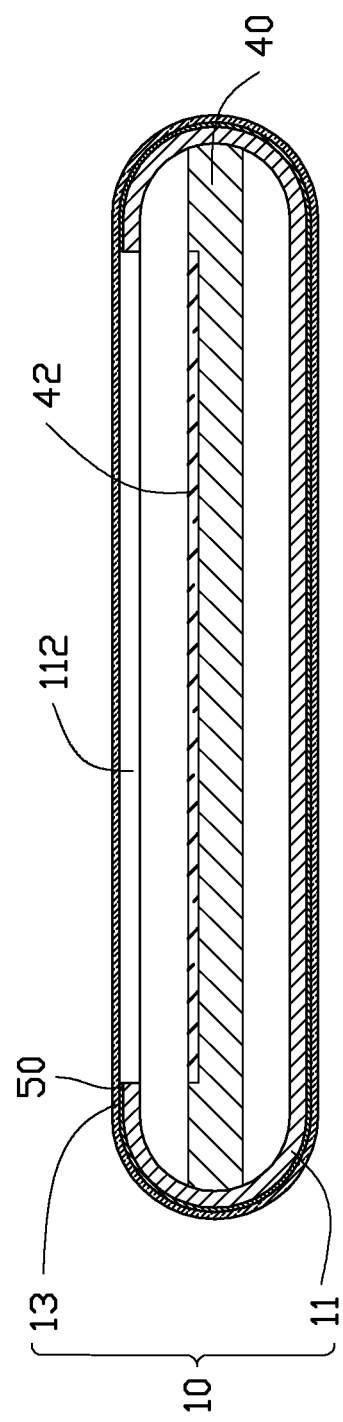
FIG. 6 is another cross-sectional view of the housing in FIG. 4 having a decorative layer taken along line V-V.

In another embodiment, a decorative layer 50 can be sandwiched between the opaque plastic member 11 and the transparent glass member 13 for decorating (see FIG. 6). The decorative layer can be made of ink or metal coating.

It should be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A housing, comprising:
 a housing defining a receiving chamber and an open end communicating with the receiving chamber; the housing comprising:
  an opaque plastic member defining a display window hole;
  a transparent glass member, the transparent glass member receiving the plastic member; and
 a cover sealing the open end.

2. The housing as claimed in claim 1, wherein the housing comprises a first sidewall, a second sidewall opposite to the first sidewall, two connecting walls connecting the first sidewall to the second sidewall, and a top wall; the first sidewall, the second sidewall, the connecting walls, and the top wall cooperatively define the receiving chamber and the open end.

3. The housing as claimed in claim 1, wherein an adhesive layer is sandwiched between the opaque plastic member and the transparent glass member.

4. The housing as claimed in claim 3, wherein a decorative layer is sandwiched between the opaque plastic member and the transparent glass member.

5. The housing as claimed in claim 4, wherein the decorative layer is made of ink or metal.

6. The housing as claimed in claim 1, wherein the glass member defines a second receiving chamber, the plastic member is received in the second receiving chamber.

7. A housing, comprising,
 a hollow sleeve;
 a top wall integrally formed with the hollow sleeve, the top wall sealing an end of the hollow sleeve to define a receiving chamber, and an open end formed at an opposite end of the top wail; the open end communicating with the receiving chamber; the hollow sleeve and the top wall comprising
  an opaque plastic member defining a display window hole;
  a transparent glass member, the transparent glass member receiving
  the plastic member, and
 a cover sealing the open end.

8. The housing as claimed in claim 7, wherein the hollow sleeve comprises a first sidewall, a second sidewall opposite to the first sidewall, two connecting walls connecting the first sidewall to the second sidewall, and the top wall; the first sidewall, the second sidewall, the connecting walls, and the top wall cooperatively define the receiving chamber and the open end.

9. The housing as claimed in claim 7, wherein an adhesive layer is sandwiched between the opaque plastic member and the transparent glass member.

10. The housing as claimed in claim 9, wherein a decorative layer is sandwiched between the opaque plastic member and the transparent glass member.

11. The housing as claimed in claim 10, wherein the decorative layer is made of ink or metal.

12. The housing as claimed in claim 7, wherein the glass member defines a second receiving chamber, the plastic member is received in the second receiving chamber.

13. An electronic device, comprising:
 a housing comprising
  a housing defining a receiving chamber and an open end communicating with the receiving chamber; the housing comprising
   an opaque plastic member defining a display window hole;
   a transparent glass member, the transparent glass member receiving the plastic member; and;
  a cover sealing the open end;
 an electronic module comprising a display screen aligning to the display window hole.

14. The electronic device as claimed in claim 13, wherein the housing comprises a first sidewall, a second sidewall opposite to the first sidewall, two connecting walls connecting the first sidewall to the second sidewall, and a top wall; the first sidewall, the second sidewall, the connecting walls, and the top wall cooperatively define the receiving chamber and the open end.

15. The electronic device as claimed in claim 13, wherein an adhesive layer is sandwiched between the opaque plastic member and the transparent glass member.

16. The electronic device as claimed in claim 13, wherein a decorative layer is sandwiched between the opaque plastic member and the transparent glass member.

17. The housing as claimed in claim 16, wherein the decorative layer is made of ink or metal.

18. The housing as claimed in claim 13, wherein the glass member defines a second receiving chamber, the plastic member is received in the second receiving chamber.

\* \* \* \* \*